United States Patent
Spayde et al.

(10) Patent No.: US 8,470,124 B1
(45) Date of Patent: Jun. 25, 2013

(54) COLD PRESSING PROCESS FOR POLYAMIDE EPICHLOROHYDRIN (PAE) BASED WOOD ADHESIVE

(75) Inventors: Timothy F. Spayde, Danville, VA (US); Chris J. Watt, Bellingham, WA (US); Steven Pung, Kernersville, NC (US)

(73) Assignee: Columbia Forest Products, Inc., Portland, OR (US)

( * ) Notice: Subject to any disclaimer, the term of this patent is extended or adjusted under 35 U.S.C. 154(b) by 93 days.

(21) Appl. No.: 13/206,305

(22) Filed: Aug. 9, 2011

Related U.S. Application Data

(60) Provisional application No. 61/374,530, filed on Aug. 17, 2010.

(51) Int. Cl.
*C09J 201/02* (2006.01)
*C09J 201/04* (2006.01)

(52) U.S. Cl.
USPC ............... 156/331.1; 156/331.5; 156/333

(58) Field of Classification Search
USPC ............... 156/330, 331.1, 331.5, 333
See application file for complete search history.

(56) References Cited

U.S. PATENT DOCUMENTS

| | | |
|---|---|---|
| 7,252,735 B2 | 8/2007 | Li |
| 7,393,930 B2 | 7/2008 | Li et al. |
| 7,416,598 B2 | 8/2008 | Sun et al. |
| 7,736,559 B2 | 6/2010 | Rivers et al. |
| 7,772,712 B2 | 8/2010 | Frayne |
| 7,781,501 B2 | 8/2010 | Dopico et al. |
| 7,785,440 B2 | 8/2010 | Li |
| 2003/0078323 A1 | 4/2003 | Zhang et al. |
| 2005/0106686 A1 | 5/2005 | Jetten et al. |
| 2005/0166796 A1 | 8/2005 | Sun et al. |
| 2007/0148339 A1 | 6/2007 | Wescott et al. |
| 2007/0218307 A1 | 9/2007 | Li |
| 2008/0020200 A1* | 1/2008 | Stokes et al. ............ 428/332 |
| 2008/0021187 A1 | 1/2008 | Wescott et al. |
| 2008/0050602 A1 | 2/2008 | Spraul et al. |
| 2008/0066881 A1 | 3/2008 | Riehle et al. |
| 2008/0090939 A1 | 4/2008 | Netravali et al. |
| 2008/0292886 A1 | 11/2008 | Allen et al. |
| 2009/0098387 A1 | 4/2009 | Brady et al. |
| 2009/0162680 A1* | 6/2009 | Zheng et al. ............ 428/461 |
| 2010/0068543 A1* | 3/2010 | Hayward et al. .......... 428/511 |
| 2010/0069534 A1 | 3/2010 | Wescott et al. |
| 2010/0093896 A1* | 4/2010 | Spraul et al. ............. 524/25 |
| 2010/0197185 A1 | 8/2010 | Herbert |
| 2010/0256289 A1 | 10/2010 | Williamson et al. |

OTHER PUBLICATIONS

Allen, Anthony J. et al., "Improved CARB II Compliant Soy Adhesives for Laminates," Hercules presentation at the Forest Products Society, Sep. 29, 2009.

(Continued)

*Primary Examiner* — Katarzyna Wyrozebski Lee
*Assistant Examiner* — Scott W Dodds
(74) *Attorney, Agent, or Firm* — Schwabe, Williamson & Wyatt

(57) ABSTRACT

Embodiments of the present disclosure describe ambient temperature pressing ("cold pressing") of a wood-based product using protein/PAE adhesives within industrially suitable set times and press pressures. A method includes preparing an adhesive comprising a protein source and polyamideamine-epichlorohydrin (PAE) resin, applying the adhesive to one or more wood-based components, and cold pressing the one or more wood-based components to form a wood-based structure, the cold pressing being the only pressing operation in the formation of the wood-based structure after applying the adhesive to the one or more wood-based components. Other embodiments may be described and/or claimed.

19 Claims, 2 Drawing Sheets

OTHER PUBLICATIONS

Hunt, Chris et al., "Soy Adhesive-Moisture Interactions," Heartland Resource Technologies LLC presentation at the Forest Products Society, 2010.

Watt, Chris, "Soy Adhesive for Hardwood Plywood," Columbia Forest Products presentation at the Washington State University Symposium, 2007.

Westcott, James et al., "Sticking Power from Soya Beans," Chemistry and Industry, Jul. 2, 2011, Issue 3.

Schmitz, John F, Jr., "Enzyme Modified Soy Flour Adhesives," Iowa State University, 2009, pp. 1-105.

Zhong, Zhikai, "Isoelectric pH of Polyamide-Epichlorohydrin Modified Soy Protein Improved Water Resistance and Adhesion Properties," Journal of Applied Polymer Science, 2007, vol. 103, No. 4, pp. 2261-2270.

* cited by examiner

COLD PRESSING PROCESS FOR POLYAMIDE EPICHLOROHYDRIN (PAE) BASED WOOD ADHESIVE

CROSS-REFERENCE TO RELATED APPLICATIONS

This disclosure claims priority to U.S. Provisional Patent Application No. 61/374,530 filed Aug. 17, 2010, the entire specification of which is hereby incorporated by reference in its entirety for all purposes, except for those sections, if any, that are inconsistent with this specification.

FIELD

Embodiments of the present invention relate generally to adhesives and processes used in manufacture of wood-based products such as plywood.

BACKGROUND

The alkalinity of early soybean protein (soy) adhesives was high and was not suitable for hardwood plywood, with the high pH discoloring the decorative hardwood face. Soy adhesives were largely displaced in the plywood industry after World War II by urea-formaldehyde (UF) adhesives and phenol-formaldehyde adhesives due to cost and performance. Resurgence in soy adhesives has occurred in recent years due to concerns over the use of formaldehyde, which is listed as a known carcinogen.

An adhesive mix utilizing a polyamidoamine-epichlorohydrin (PAE) resin is currently used in the hardwood plywood industry. The PAE resins are known as thermally-setting adhesives. Thermally setting in this case means that to overcome the reactive energy barrier, a minimum temperature must be achieved. In the case of PAE resins, the azetidinium functional group is a ring structure. The ring must be opened for the PAE to react with the chemical components of the adhesive and adherent. The open and closed rings are in equilibrium. While a high pH will increase the percentage of open ring structures, too high of a pH makes the adhesive unstable and therefore the glue is not able to be processed in an industrial setting. PAE resins are stored at low pH to reduce the frequency of ring opening. A current practice relies on a stable adhesive with a pot life, i.e., remains pumpable, for hours or days, and then becomes set or reacted with the application of heat. The set gives the adhesive the required water resistance as outlined for Hardwood Plywood Association (HWPA) for Type II adhesives. However, the application of heat may increase energy requirements, increase fugitive emissions or off-gassing, and/or increase thermal stresses and/or defects such as warping, casehardening, or charring, which defects may particularly hinder the formation of decorative plywood.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure describe the practice of ambient temperature pressing ("cold pressing") a wood-based structure using protein/PAE adhesives within industrially suitable set times and press pressures. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Figure 1:
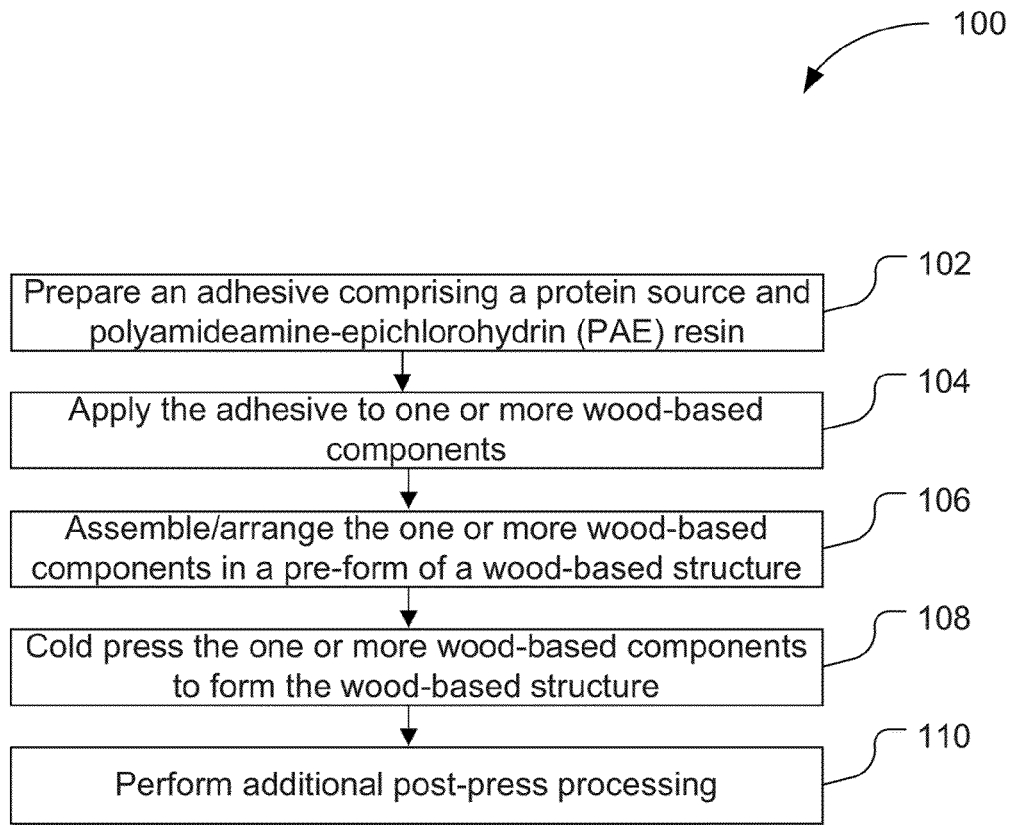
FIG. 1 schematically illustrates a process flow diagram of a method for fabricating a wood-based structure using an adhesive comprising a protein source and polyamideamine-epichlorohydrin (PAE) resin and a cold pressing technique.

FIG. 1 schematically illustrates a process flow diagram of a method 100 for fabricating a wood-based structure using an adhesive comprising a protein source and polyamideamine-epichlorohydrin (PAE) resin and a cold pressing technique. At 102, the method 100 includes preparing an adhesive comprising a protein source and PAE resin.

According to various embodiments, the protein source may include any of a variety of suitable proteins such as, for example, a soybean protein, a peanut protein, a cotton seed protein, a hemp seed protein, lupine bean protein, canola seed protein, or casein protein, or suitable combinations thereof. Other protein sources can be used in other embodiments. The protein source generally provides functionality in quaternary structures including carboxyl functional groups such as carboxylic acids that cross-link with the PAE resin.

For the sake of clarity of discussion, multiple embodiments are generally discussed for an adhesive where defatted soy flour (soy flour) is used as the protein source, however other suitable protein sources including vegetable/non-vegetable and/or isolates or concentrates can be used in other embodiments. Soy flour for the adhesive may have a protein content from about 35% to about 60% by weight. In some embodiments, the protein content of the soy flour is from 45% to 50% by weight. The grinding level of the soy flour may include, for example, 100 mesh or 200 mesh according to wire cloth and sieves standards of the American Society for Testing and Materials (ASTM) E11-09e1. In general, the grinding level of the protein source should result in an adhesive that is smooth in texture and substantially free from lumps to facilitate flow of the adhesive through pumps, pipes, and/or applicators.

The soy flour may have a protein dispersibility index (PDI) of about 90, which indicates about 90% protein solubility in water. A lower PDI generally corresponds with less functionality in the quaternary structures of the protein (e.g., for cross-linking with the PAE resin) while a higher PDI generally corresponds with higher functionality in the quaternary structures of the protein. The solubility of the protein can be increased by denaturing the soy flour by mechanical and/or chemical means.

The PAE resin may comprise azetidinium functional groups to cross-link with the protein. The PAE resin may, for example, have an azetidinium content from about 45% to about 75% based on mole fraction of azetidinium to other functional groups (e.g., secondary amines, amino chlorohydrins, glycose, and cross-linked groups) of the PAE resin. In an embodiment, the PAE resin has an azetidinium content from 65% to 70% based on mole fraction groups of the PAE resin. Polymers of the PAE resin should have a molecular weight that provides a viscosity of the PAE resin that is greater than 20 centipoise (cP) for an aqueous solution that comprises 20% solid composition by weight and has a pH from 2 to 3, at 25° C. The PAE resin can include, for example, PAE resins that are commercially available from Ashland Incorporated based in Covington, Ky. under the trade names CA1100 or CA1000.

A ratio of the protein source (e.g., soy flour) to the PAE resin in a mixture based on solids can vary from 0.5:1 to 25:1 by weight. In an embodiment, the ratio of the protein source to the PAE resin in the mixture based on solids is about 7:1 by weight. Water may be added to the protein source and the PAE resin to form a mixture having from 20% to 50% solids by weight in the mixture. In an embodiment, the solids content of the mixture is from 38% and 40% by weight. The percentage of solids in the mixture can vary according to operational needs of the process or technical needs of a wood-based product formed using the mixture. For example, the solids content can vary according to moisture content and/or density of different types of wood-based products (e.g., substrate platform products, decorative overlay products, particleboard, or veneer species). The water, the protein source (soy flour), and the PAE resin are mixed until a smooth consistency is obtained, which can occur on the order of minutes.

A base is added to the mixture of the water, the protein source (soy flour), and the PAE resin. In an embodiment, the base is an inorganic base including, for example, a hydroxide of group IA or IIA metals. The base may unfold a tertiary protein structure of the protein source and facilitate greater functionality on the protein's surface. The base may further facilitate activation of the PAE resin for cross-linking. Functionality in the quaternary structure of the protein may cross-link with the azetidinium functional groups and impart a degree of water resistance to the adhesive at low to moderate temperatures (e.g., ambient temperatures). The PAE resin may further cross-link with carboxyl functional groups of components of a wood-based product upon which the adhesive mixture is applied, producing both interphase and intraphase species of cross-linked water resistant adhesive and wood-adhesive bonding. According to various embodiments, the pH of the mixture including the base is greater than 7. A higher pH generally corresponds with increased water resistance of the adhesive and increased activation of the PAE resin.

Modifiers can be added to the mixture to facilitate processing of the adhesive. In an embodiment, sodium metabisulfite is added to modify viscosity of the adhesive by breaking down disulfide linkages in the tertiary structures of the protein and unfolding or separating protein polymers. Other modifiers can be added to the adhesive to aid in surface wetting/penetration of the adhesive to the wood-based product, reduce foaming, or alter liquid surface tension.

At 104, the method 100 further includes applying the adhesive to one or more wood-based components. The wood-based components can include a wide variety of materials including, for example, a substrate, laminate, veneer, agglomeration of lingo-cellulosic material, and/or other components for forming wood-based structures such as plywood, decorative panels, doors, and the like. The wood-based components may include smooth, flat surfaces upon which the adhesive is applied.

The adhesive may be applied to the one or more wood-based components at an adhesive application station using one or more applicators such as a roll coater type of applicator to deposit/apply the adhesive to surfaces of the wood-based components. Other types of applicators can be used in other embodiments. The adhesive application rate may depend on a variety of factors including, for example, temperature of the wood-based component, ambient conditions (e.g., temperature, humidity), and the type of wood-based component. In an embodiment, the adhesive is applied at a rate of 0.019 to 0.022 (g/cm$^2$) grams of adhesive per square centimeter of a surface of the one or more wood-based components. Lower or higher application rates can be used in other embodiments.

At 106, the method 100 further includes assembling/arranging the one or more components in a pre-form of a wood-based structure. The pre-form may be a configuration of the one or more wood-based components just prior to the cold pressing of the one or more components to form the wood-based structure. For example, laminates with applied adhesive may be placed on top of one another to provide a pre-form of a wood-based product. The laminates may be selected and/or arranged to provide qualities such as dimensional stability, stiffness, and/or aesthetic appearance in the wood-based product.

In some embodiments, the one or more wood-based components are arranged in the pre-form of a panel. The panel may generally include at least a first wood-based component (laminate) and a second wood-based component (laminate) of similar or same length and width. The panel may include 2 to 50 laminates in some embodiments. In some embodiments, the panel has major dimensions of about 8 feet by 4 feet (length and width) and minor dimensions of about ¼ inch to 1 inch (thickness). The panel may be a ridge plate or plywood in some embodiments. According to various embodiments, the pre-form panel may be stacked with a plurality of pre-form panels (e.g., 30-40 pre-form panels stacked together). Prior to the cold pressing, each of the pre-form panels may be loosely held together by the applied adhesive and the weight of other panels in the stack.

At 108, the method 100 further includes cold pressing the one or more wood-based components to form the wood-based structure. In an embodiment, the cold pressing is the only pressing operation in the formation of the wood-based structure after applying the adhesive to the one or more wood-based components at 104. That is, the wood-based structure may be formed from the constituent wood-based component(s) without using a hot press or other heat application process that is typically used to activate the adhesive.

In some embodiments, cold pressing includes applying a pressure, at ambient temperature without applying heat, to the one or more wood-based components (pre-form) over a time period to form the wood-based structure. According to some embodiments, the cold pressing pressure is from 120 to 150 pounds per square inch (PSI) and the time period for the applied pressure (press time) is from 30 to 60 minutes. The ambient temperature may range, for example, from about 40° Fahrenheit (F) to 95° F., and embodiments have been shown to be effective with ambient temperature ranges up to 110° F. Other pressures, time periods, and/or ambient temperatures can be used in other embodiments.

In an embodiment where the one or more wood-based components are configured in a stacked plurality of pre-forms of the wood-based structure, the stacked plurality of pre-forms may be placed into a single opening of a cold press to simultaneously cold press the stack in a single batch process. For example, in a case where the pre-forms are pre-form panels, the simultaneous cold pressing of the stack of pre-form panels may form 30-40 discrete panels. One or more of the stacked pre-form panels can include decorative surfaces that may normally be charred or otherwise structurally warped or damaged by application of heat such as in a hot press operation. In an embodiment, the cold pressing forms the decorative plywood panel without thermal-related stresses or defects.

A time that lapses between applying the adhesive at 104 to a first component of the one or more wood-based components and starting of the cold pressing of the one or more wood-based components at 108 should be short enough to ensure that the adhesive is still flowable and has not dried out. For example, if the viscosity of the adhesive becomes too high and/or the moisture of the adhesive is lost to the air or substrate, the adhesive will not transfer and wet an opposing laminate face resulting in an ineffective adhesive bond, which is a failure commonly referred to as a "dry-out" in the plywood industry. In some embodiments, the amount of time allowed to lapse between applying the adhesive to a first component of the one or more wood-based components and starting of the cold press is less than 30 minutes.

Forming the wood-based product (e.g., panel of plywood) by using only a cold press process without a hot press or other application of heat provides several benefits. The cold pressing provides an efficient means of producing plywood including decorative plywood. For example, current plywood fabrication processes may generally use a single opening of a hot press to receive each individual pre-form panel in unstacked form, then the hot press is performed on the single panel to cure or cross-link the adhesive. Using a cold press process as described herein may reduce labor associated with hot press operations including singulation/unstacking of panels for hot press processing. The cold press process may reduce fugitive emissions or off-gassing and reduce energy consumption associated with the application of heat. The cold press process may further provide a variety of structural or decorative benefits including formation of panels such as decorative panels that are free of thermal-related stresses or defects including warping, casehardening, charring, and/or other damage that may be incurred by loading/handling of individual panels into the hot press or other heat applicator. Further, a thickness of wood-based components such as thickness of a substrate or veneer may be better preserved using the cold press only due to lack of heat, which may reduce post-press sanding needed to correct defects or changes in thickness.

At 110, the method 100 may further include performing additional post-press processing. The additional post-press processing can include, for example, sawing the wood-based structure into smaller parts, sanding the wood-based structure, and/or packaging the wood-based structure for shipping to a customer.

Examples provided below outline a method by which a cold press technique was applied to the manufacture of hardwood plywood. An adhesive was prepared using a soy protein source and PAE resin. The soy/PAE adhesives had a low pH (e.g., 6.8-7.0), low viscosity, long pot life (e.g., 2 hours) and a short cold press time (e.g., between 25-60 minutes).

Early phase cold-set panel construction resembled a traditional 3-ply construction method. A 7/16 veneer core platform was used for one subject, and a 7/16 particle board core (PBC) board for another. A glue application rate of approximately 40-45 g/m² single glue line (SGL) was used with a cold-press pressure of approximately 95 PSI. After 25 minutes of pressing, the units were stacked in a stack of approximately 50 for approximately 16 hours. The panels were then sawn and the bond was tested using the knife method. While there were a few delaminated edges, the physical bond showed desirable characteristics and the proof of concept was established.

Several types of panels were produced using Poplar veneer innerplies and both raw medium density fiberboard (MDF) and door skins. The raw MDF panels could be used as a classic core platform that could later have hardwood bonded to it, and the skins would be a finished product. Minor adjustments were made to the construction parameters, e.g., adding a little more than the standard glue rate, and a little longer cold-press time. The same stack down method discussed above was used. This test was successful from a mechanical bond perspective, and samples were subsequently subjected to, and passed, a 3-cycle soak testing. Data from the 3-cycle soak tests are provided in Table 1.

TABLE 1

| | 3-cycle soak tests | | |
|---|---|---|---|
| Sample set | 1st cycle | 2nd cycle | 3rd cycle |
| 1 | pass | pass | pass |
| 2 | pass | pass | pass |
| 3 | pass | pass | pass |
| 4 | pass | pass | pass |
| 5 | pass | pass | pass |
| 6 | pass | pass | pass |

Subsequent testing was performed on a larger sample size of the Birch panel having a Classic Core 4 (CCIV) core construction (e.g., 3 layers of Poplar veneer with an outside layer of MDF with a thin hardwood face). Consistent glue spread, press time, etc. were maintained. Those panels were tested for bond. A unit of CCIV platform was run to test for thickness consistency.

The large sample, 3-cycle soak test was conducted on 7-ply, ¾ inch Birch CCIV samples. The press cycle was 35 minutes at 125 pounds per square inch (PSI) with a glue spread of 48/48. The total assembly time was 18 minutes with the results shown in Table 2.

TABLE 2

| Number of samples | Passing First Cycle | Passing Third Cycle |
|---|---|---|
| 24 | 24 | 22 |

Figure 2:
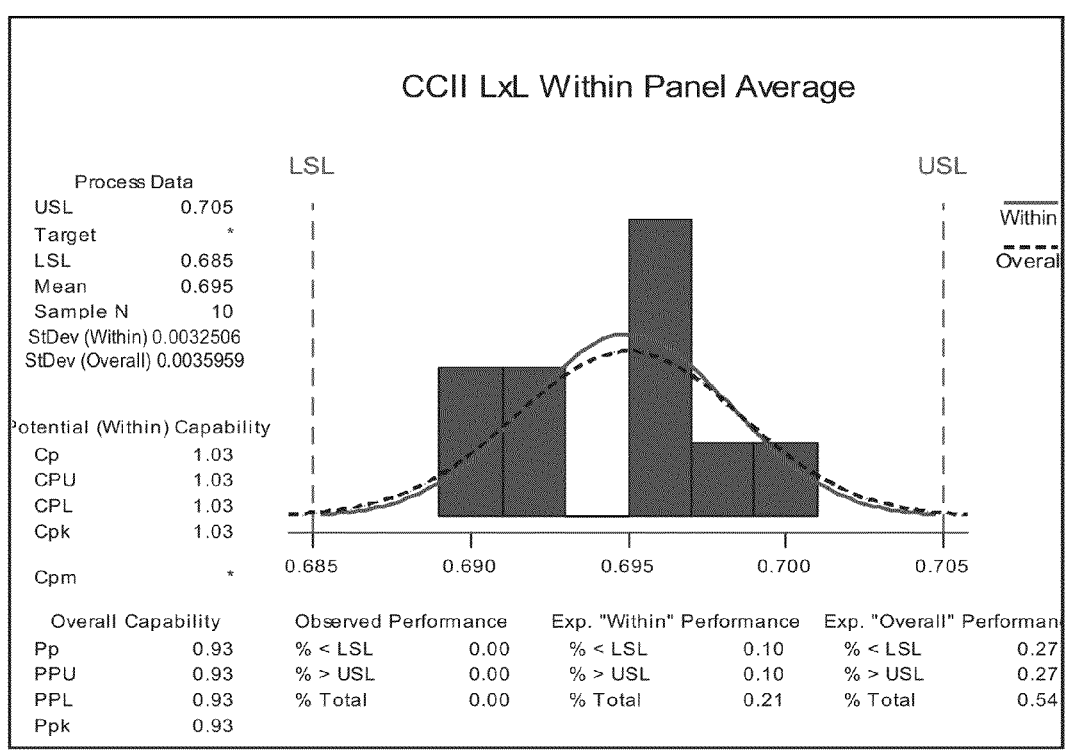
FIG. 2 schematically illustrates example supporting data for Within Panel Average measurements against specification values.

The number of samples passing the third cycle was 91.6% of the total. For reference, Hardwood Plywood and Veneer Association (HPVA) requires that 85% pass the third cycle for Type II plywood. Supporting data for Within Panel Average measurements against the specification values is depicted in the chart 200 of FIG. 2 for panels pressed using a stack pressed method.

Panels were produced with 35 minutes in the press at 135 PSI, sawed the next day, and applied with an ultraviolet (UV)-cured finish coat to test surface smoothness. This test revealed two opportunities to reduce the time in process and to improve the surface smoothness. These samples passed the 3-cycle soak test again and, because the method of bond was dewatering the adhesive, the moisture content was tested. It was determined that after 24 hours, the moisture content averaged 8%, which is well within acceptable limits. The processing time was reduced by reducing the press time to 30 minutes and immediately processing at the saw. Small chamber formaldehyde testing was performed and the results were found to be acceptable at 0.217 formaldehyde parts per million (ppm). The lab tests confirmed viability of full-scale production.

A moisture content (MC) % test was performed on 12×12 CCIV samples at 200° Fahrenheit (F). The samples were a 5-ply construction with an assembly time at spreader of 18 minutes and no stand time. The core was sourced from a West Virginia (WV) mill and was 1/6 Poplar short grain 2 piece having a veneer grade of L or M; centers were sourced from WV mill and were 1/6 Poplar long grain having a veneer grade of L or M; and face/back was 1.75 MDF (door skin) with 1/85 Birch skin. The pre-press time was 35 minutes and pre-press pressure of 135 PSI. The results are shown in Table 3.

TABLE 3

| Sample | Fresh | | 30 min | | 24 hr |
|---|---|---|---|---|---|
| 1 | 962.5 | 946.0 | 1.71% | 887.0 | 7.84% |
| 2 | 957.0 | 931.0 | 2.72% | 879.5 | 8.10% |
| 3 | 981.0 | 925.0 | 5.71% | 904.0 | 7.85% |
| 4 | 966.0 | 905.5 | 6.26% | 887.5 | 8.13% |
| Avg | 3866.5 | 3707.5 | 4.11% | 3558.0 | 7.98% |

In UV the first sander was configured to provide a very light touch. The spread rate for 2 seal coats and the medium gloss topcoat were approximately 4 mils per seal coat and approximately 5 mils for the topcoat, with a total build of approx 13 mils. Adhesion was tested with the scratch/tape method and was found to be adequate. The finished panels were very flat, but did have a slightly lumpy appearance. There was a little porous appearance attributed to open grain in the thin veneer, the inability to aggressively sand, and the normal application rate. Some of these characteristics may be mitigated with a slightly higher press pressure and a slightly higher UV spread rate.

Samples were produced to four different inner construction methods. The thickness variation as it relates to surface quality were observed and documented. All 4 sample sets were a finished 3/4" panel with Birch skins for face and back, 3 lines of 1/6 Poplar, 2 lines being long grain and 1 short. For the hybrid mixed panels of Poplar, sheets of PBC were included between each panel to improve surface quality, by reducing variation telegraphing between panels.

TABLE 4

| | Thickness Range | Ranking |
|---|---|---|
| All WV LxL | .025" | 4 |
| Mixed WV/North Carolina (NC) | .020" | 3 |
| All NC LxL | .015" | 2 |
| Mixed WV/NC w/ boards | .012" | 1 |

The construction using the hybrid mix would be acceptable by grade and any additional veneer would only serve to improve that quality.

While some disclosed embodiments discuss the cold press system in the context of hardwood plywood manufacturing, other embodiments may be used in manufacturing processes of any wood-based product that use a continuous adhesive line to adhere two wood based faces together. For example, some embodiments may use such a cold press system in edge/face gluing processes involved in door/furniture manufacturing. Products made using these cold-press systems exhibit water-resistant properties similar to those of products made using hot-press systems.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
preparing an adhesive comprising a protein source and polyamideamine-epichlorohydrin (PAE) resin;
applying the adhesive to one or more wood-based components; and
cold pressing the one or more wood-based components to form a wood-based structure, the cold pressing being the only pressing operation in the formation of the wood-based structure after applying the adhesive to the one or more wood-based components.

2. The method of claim 1, wherein:
the protein source includes a soybean protein, a peanut protein, a cotton seed protein, a hemp seed protein, lupine bean protein, canola seed protein, or casein protein; and
preparing the adhesive includes forming a mixture of the protein source, the PAE resin, and water.

3. The method of claim 2, wherein:
the protein source includes a defatted soybean flour having a protein content from 35% to 60% by weight; and
the PAE resin has an azetidinium content from 45% to 75% by mole fraction.

4. The method of claim 3, wherein:
a ratio of the protein source to the PAE resin is from 0.5:1 to 25:1 by weight; and
a solids content of the mixture is from 20% to 50% by weight.

5. The method of claim 4, wherein:
the ratio of the protein source to the PAE resin is about 7:1 by weight; and
the solids content of the mixture is from 38% to 40% by weight.

6. The method of claim 2, wherein preparing the adhesive further comprises:
adding an inorganic base to the mixture, wherein a pH of the mixture is greater than 7.

7. The method of claim 6, wherein preparing the adhesive further comprises:
adding sodium metabisulfite to the mixture.

8. The method of claim 1, wherein:
the one or more wood-based components include a substrate, a laminate, a veneer, or an agglomeration of lignocellulosic material; and
the wood-based structure is a panel of plywood.

9. The method of claim 1, wherein applying the adhesive to one or more wood-based components comprises:
applying the adhesive at a rate of 0.019 to 0.022 grams of the adhesive per square centimeter of a surface of the one or more wood-based components.

10. The method of claim 1, further comprising:
arranging, prior to the cold pressing, the one or more wood-based components having the applied adhesive in a pre-form of the wood-based structure.

11. The method of claim 10, wherein the pre-form of the wood-based structure is a pre-form panel comprising at least a first wood-based component and a second wood-based component, the method further comprising:
stacking a plurality of pre-form panels including the pre-form panel; and placing the stacked plurality of pre-form panels into a single opening of a cold press, wherein cold pressing the one or more wood-based components includes simultaneously cold pressing the stacked plurality of pre-form panels in a single batch process to form a corresponding plurality of discrete wood-based structures.

12. The method of claim 1, wherein the cold pressing comprises:

applying a pressure, at ambient temperature without applying heat, to the one or more wood-based components over a time period to form the wood-based structure.

13. The method of claim 12, wherein the pressure comprises from 120 to 150 pounds per square inch (PSI) and the time period is from 30 to 60 minutes.

14. The method of claim 12, wherein the ambient temperature is between 40° Fahrenheit (F) and 95° F.

15. The method of claim 1, wherein a time that lapses between applying the adhesive to a first component of the one or more wood-based components and starting of cold pressing the one or more wood-based components is less than 30 minutes.

16. The method of claim 1, wherein:

the wood-based structure comprises a decorative plywood panel; and the cold pressing provides the decorative plywood panel without thermal-related stresses or defects.

17. The method of claim 1, further comprising:

sawing the wood-based structure.

18. The method of claim 17, further comprising:

sanding the wood-based structure.

19. The method of claim 17, further comprising:

packaging the wood-based structure.

\* \* \* \* \*